Nov. 6, 1951  F. P. ARMSTEAD  2,573,946
THREE-DIMENSIONAL MATHEMATICAL DEMONSTRATOR
Filed Aug. 7, 1947  7 Sheets-Sheet 1
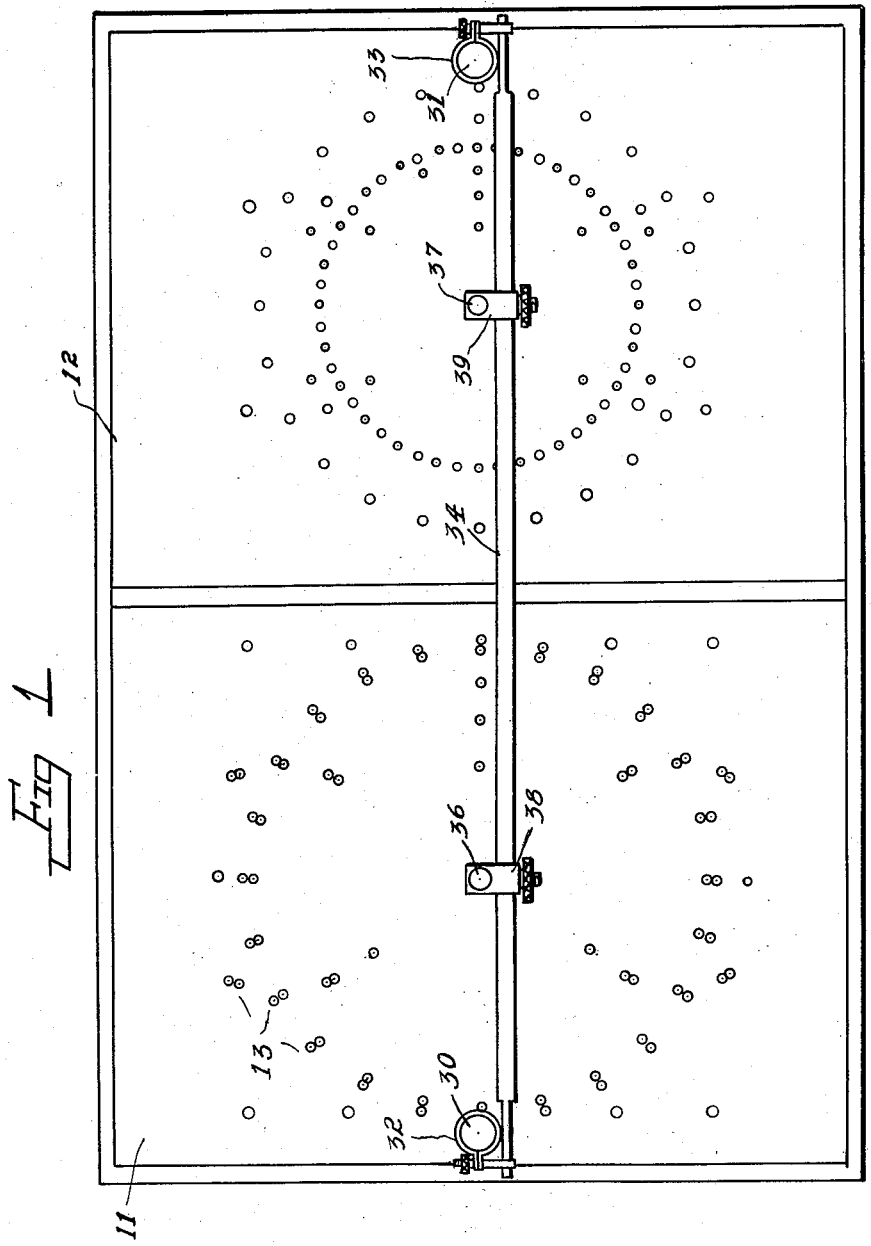
INVENTOR.
FLOYD P. ARMSTEAD
BY
Smith & Wells

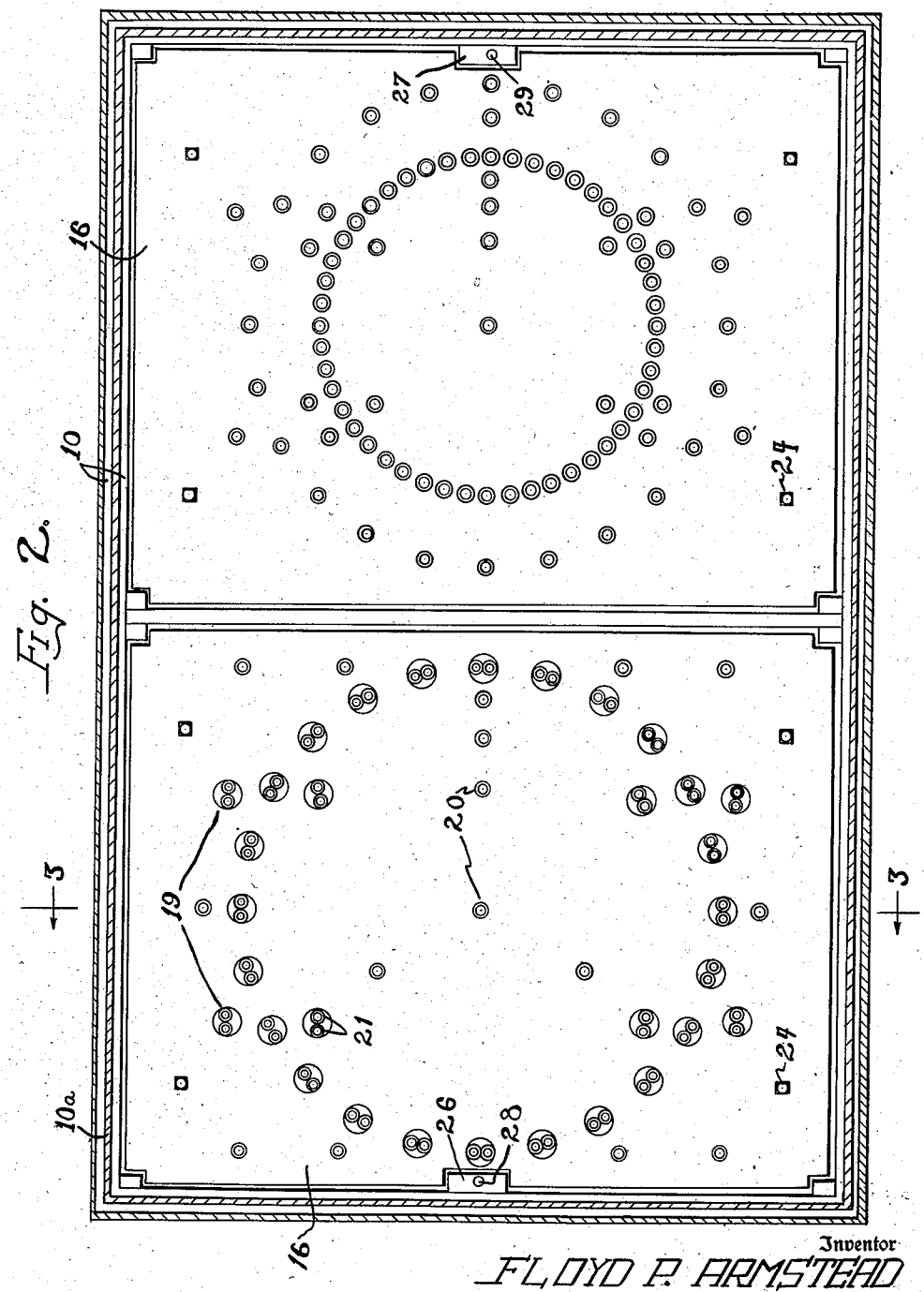

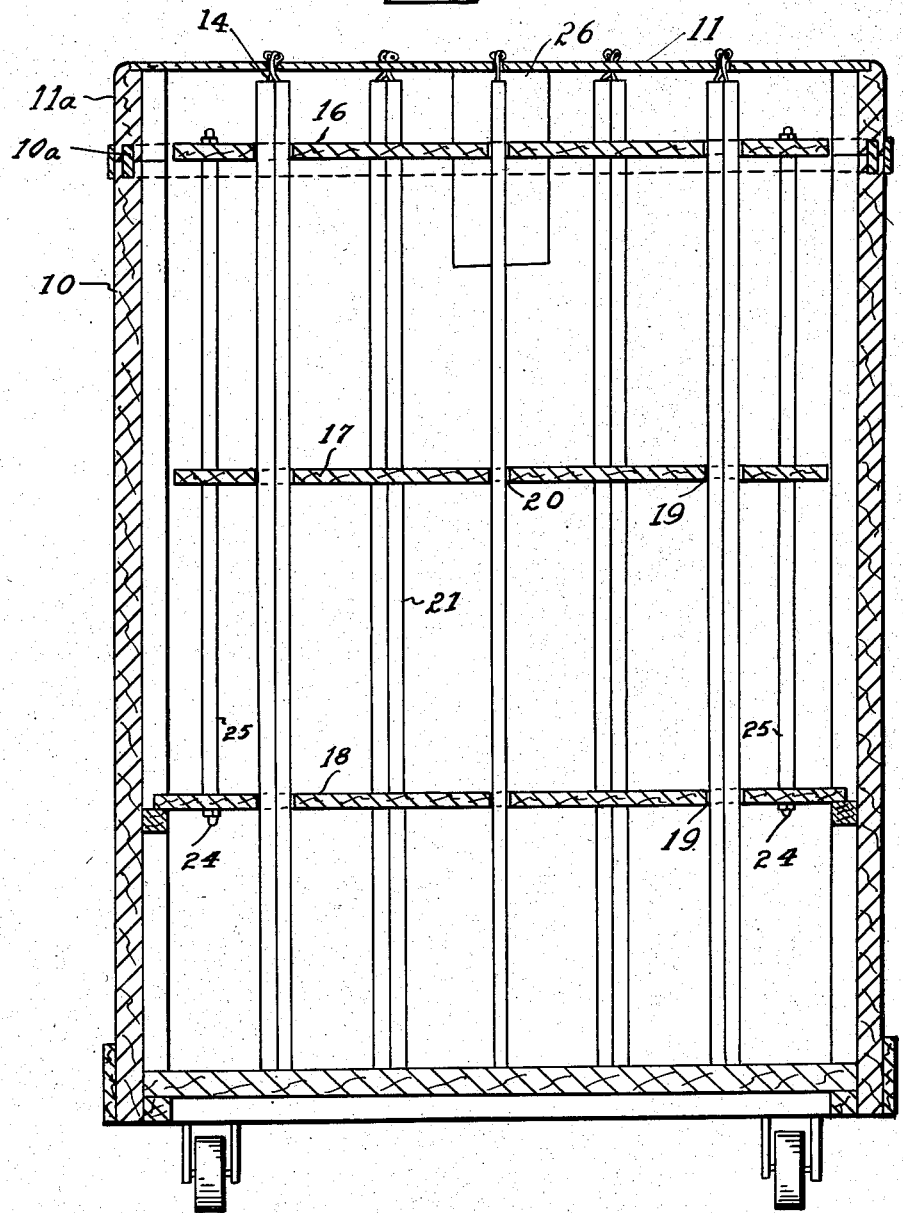

Nov. 6, 1951     F. P. ARMSTEAD     2,573,946
THREE-DIMENSIONAL MATHEMATICAL DEMONSTRATOR
Filed Aug. 7, 1947     7 Sheets-Sheet 4
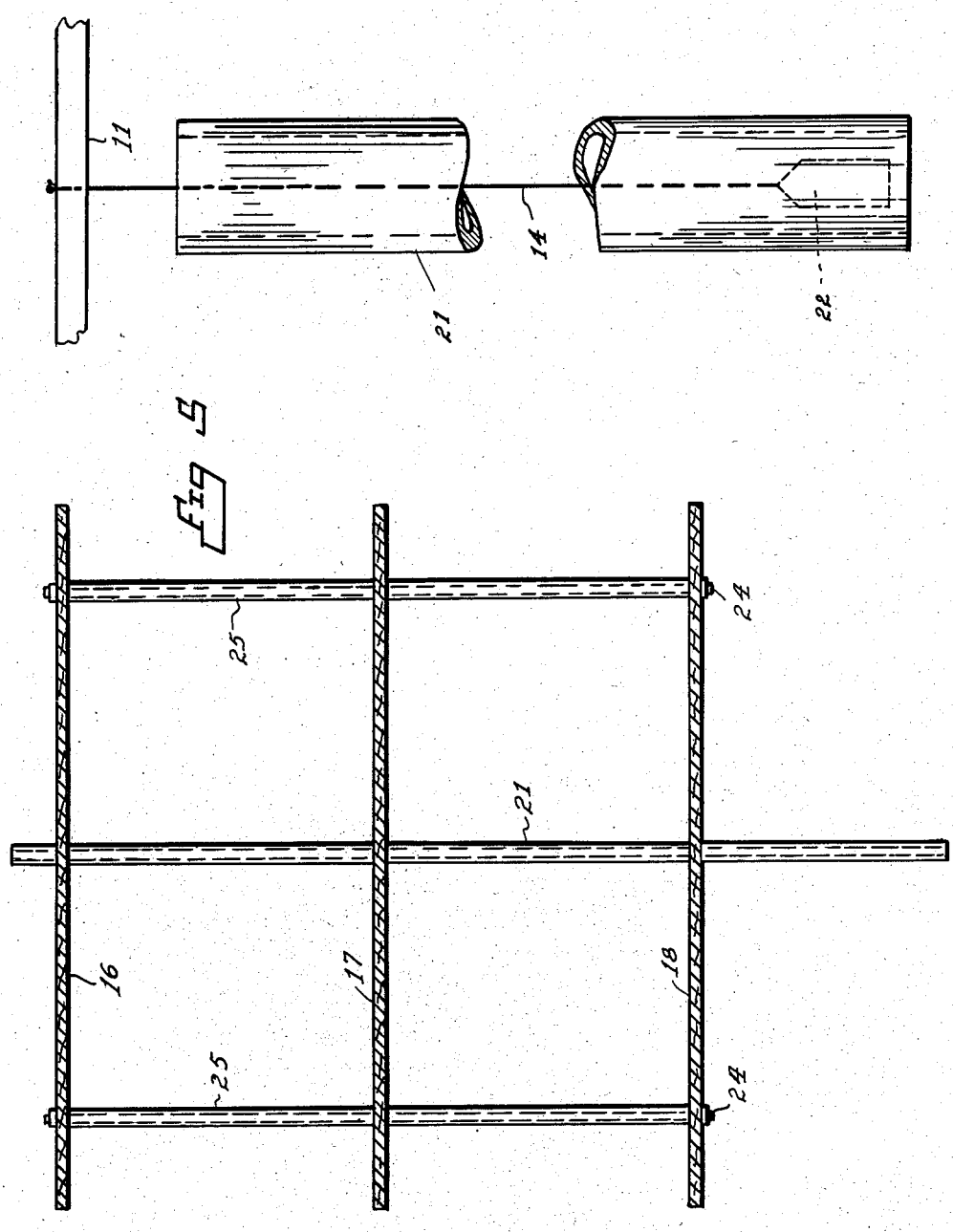
INVENTOR.
FLOYD P. ARMSTEAD
BY
Smith & Wells Nov. 6, 1951     F. P. ARMSTEAD     2,573,946
THREE-DIMENSIONAL MATHEMATICAL DEMONSTRATOR
Filed Aug. 7, 1947     7 Sheets-Sheet 5
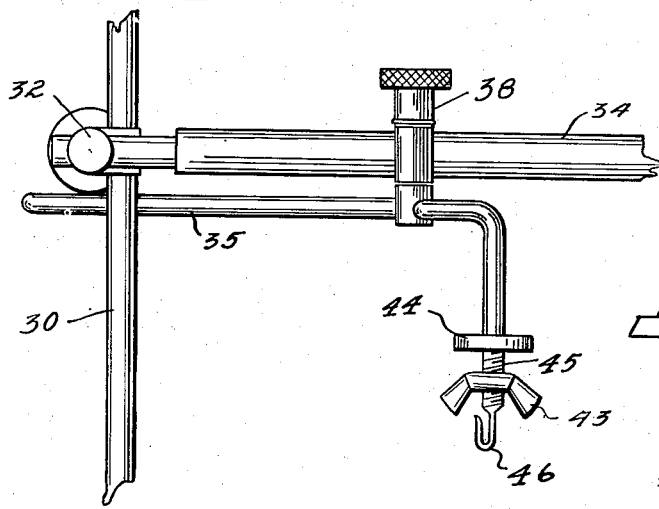
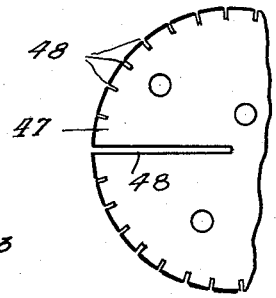
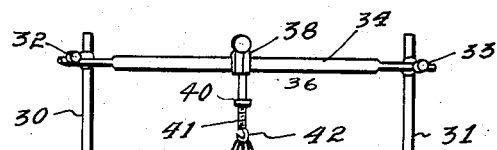
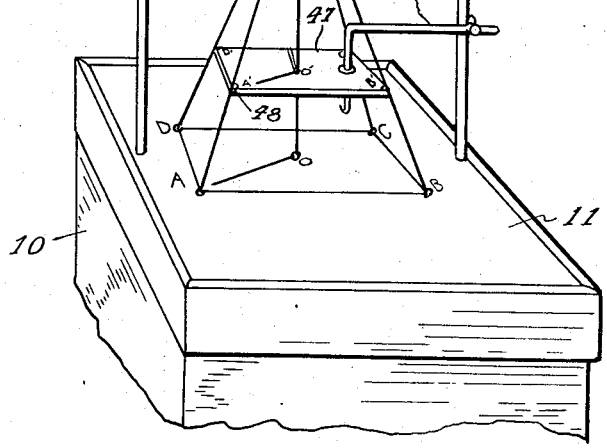
INVENTOR.
FLOYD P. ARMSTEAD
BY
Smith & Wells Nov. 6, 1951 F. P. ARMSTEAD 2,573,946
THREE-DIMENSIONAL MATHEMATICAL DEMONSTRATOR
Filed Aug. 7, 1947 7 Sheets-Sheet 6

Inventor
FLOYD P. ARMSTEAD
By
Smith & Wells
Attorney

Nov. 6, 1951 F. P. ARMSTEAD 2,573,946
THREE-DIMENSIONAL MATHEMATICAL DEMONSTRATOR
Filed Aug. 7, 1947 7 Sheets-Sheet 7
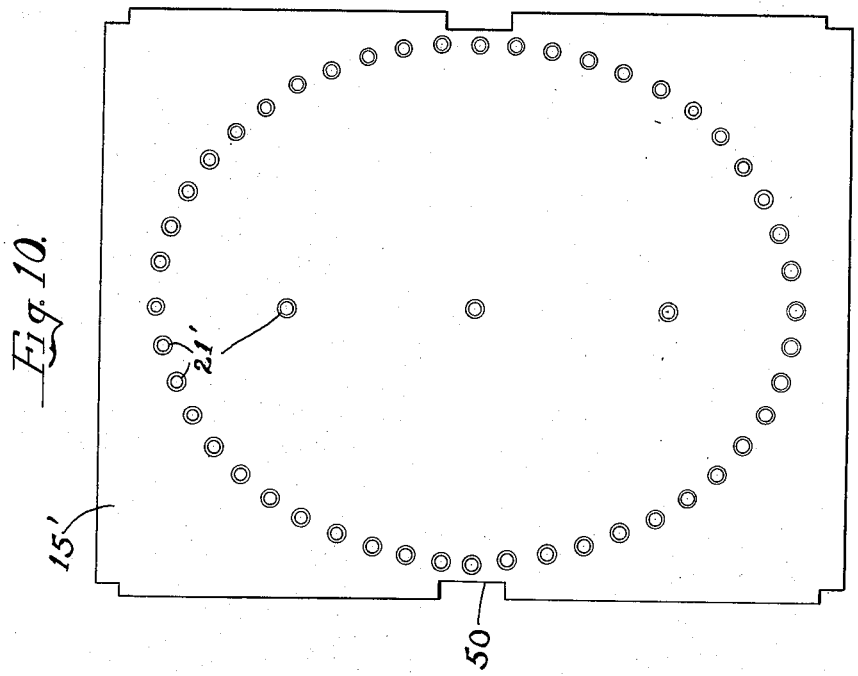
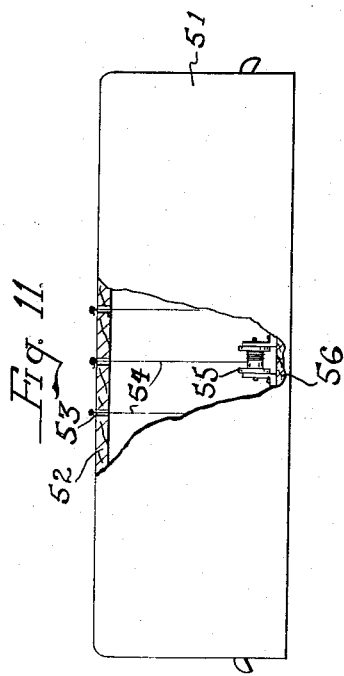
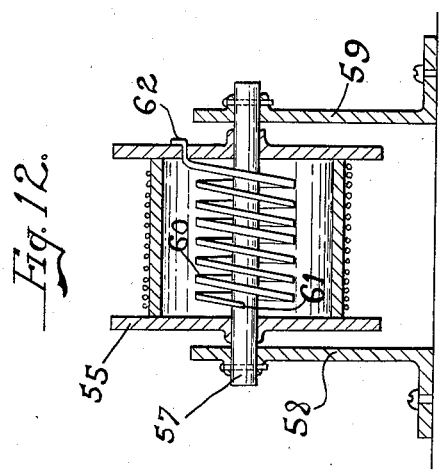
Inventor
FLOYD P. ARMSTEAD
By
Attorney Patented Nov. 6, 1951

2,573,946

UNITED STATES PATENT OFFICE 2,573,946

THREE-DIMENSIONAL MATHEMATICAL DEMONSTRATOR

Floyd P. Armstead, Shelton, Wash.

Application August 7, 1947, Serial No. 767,198

3 Claims. (Cl. 35—34)

The present invention relates to a three dimensional mathematical demonstrator.

The principal purpose of my invention is to provide means for demonstrating to students the basic concepts of geometric figures. The traditional method of illustrating geometric figures on a blackboard is somewhat inadequate because the fore-shortened lines resulting from representing a three dimensional figure on a two dimensional plane confuses many students. There is always a certain amount of optical illusion in viewing these single plane representations of solids.

More particularly, it is a purpose of my invention to provide a demonstrator that would show in three dimensions the relative position of lines, planes, polyhedra, cylinders, and cones in space. This mechanical device as contemplated illustrates the figures necessary for the solution of most of the basic theories and corollaries used in the study of solid geometry.

It is also a purpose of my invention to provide a demonstrator of the character above referred to which will have a range of figures and spatial relationships adequate to present most of the types of problems in solid geometry, excepting those relating to a sphere. The demonstrator is constructed to allow for easy transition from the illustration of one shape or figure to the illustration of another figure of the same type. The figures as demonstrated are transparent or open to allow for internal viewing so that the intersections of lines and planes, and the relative positions of inscribed figures may be seen.

A further purpose of my invention is to provide in a demonstrator of the character described, a suitable base having a plane surface to permit the marking of figures or parts of figures thereon and suitable labeling thereof, in combination with means to support, above the base, a multiplicity of flexible lines in close relation and additional plane surface elements to demonstrate the appearance of the figures under discussion. The entire device, including the movable supporting parts and the flexible construction members, is of such construction as to permit a quick change from one type of figure to another type of figure so that the amount of time necessary to set up a required solid on a demonstrator is generally less than would be required to draw the three-dimensional solid on the blackboard.

It is a further and more specific object of my invention to provide a mathematical demonstrator consisting of a table section divided into two removable sections either of which may be used as a surface to write upon with chalk, the removable sections containing holes arranged in definite geometrical patterns through which are led construction strings to outline the geometric figures, in combination with a support for the table including a rack of tubes each of the removable sections for containing and guiding the construction strings and small weights to hold them in place. Overhead holding means are secured to the table by quickly removable supporting rods to which the holding means are attached.

The novel features that I consider characteristic of my invention are set forth with particularity in the claims. The invention itself, however, both as to its organization and its method of operation, together with additional objects and advantages thereof, will be understood from the description of a specific embodiment when read in connection with the accompanying drawings, in which:

Figure 1 is a plan view of the device embodying my invention;

Figure 2 is a plan view with the top portion of the device removed to illustrate the construction beneath the top portion;

Figure 3 is a vertical section taken on the line 3—3 of Figure 2;

Figure 4 is a fragmentary sectional view of the string mounting frame of the device;

Figure 5 is an enlarged fragmentary view illustrating how the strings are held down in place;

Figure 6 is a perspective view illustrating the formation of a geometrical figure by means of the strings and the supporting rod structure on the device;

Figure 7 is a fragmentary view of the supporting rod mechanism illustrating the manner in which the parts are clamped together;

Figure 8 is a fragmentary detail view showing the manner of forming auxiliary surfaces such as discs, squares, etc., to receive the strings and for attachment to the supporting rods;

Figure 10 is a plan view of a modified tube rack to demonstrate elliptical bodies;

Figure 11 is a view, in side elevation, of a desk type of unit; and

Figure 12 is a detail view of the string holding device used with Figure 10.

Figure 9:
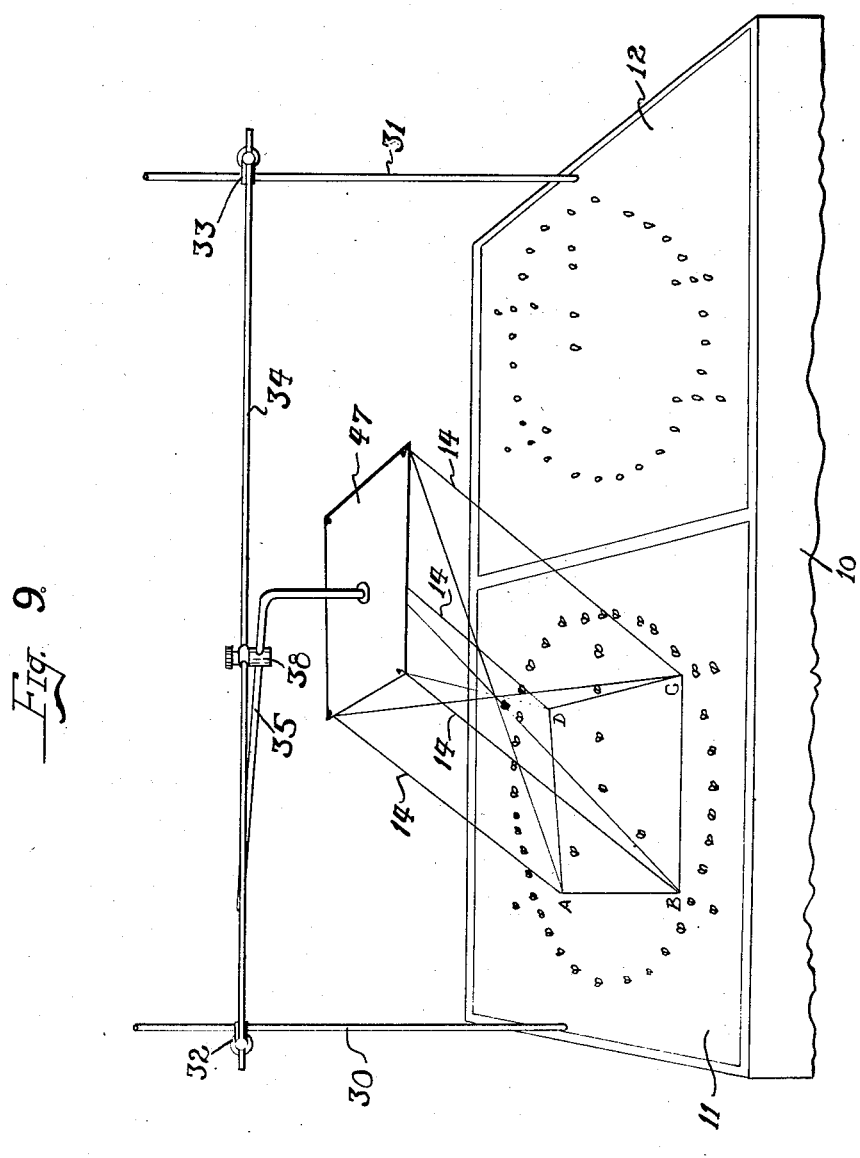
Figure 9 is a view like Figure 6 showing a different type of solid demonstrated.

Referring now to the drawings, and particularly to Figures 1, 2 and 3, the basic construction of the device embodies a portable rectangular housing 10, the base of which may be provided with suitable casters as shown so that it may be moved around on the floor. The housing has an open top which is adapted to receive two removable sections 11 and 12 which are provided with a coating such as is used for blackboards. Each of the sections 11 and 12 is preferably made of a suitable sheet material such as plywood or a composition sheet and a supporting frame. The section 11 is shown as provided with a number of drilled holes 13, most of which are arranged in pairs but some of which are single holes spaced substantially from the adjacent holes. The holes are arranged in definite geometric patterns through which are led strings 14 (see Figure 5), the strings being used to outline the figures in designs to be demonstrated. The ends of the strings are knotted or provided with any suitable head to keep them from falling through the holes.

Within the housing, directly beneath each unit of the top, is a series of tube guides. The guides comprise three spaced parallel panels 16, 17 and 18 provided with suitable holes 19 therethrough to receive tubes 21. Some of the holes in the guides are large enough to receive two tubes 21 side by side while other holes are large enough only for a single tube as shown at 20 in Figure 3 of the drawings. The tubes 21 are all alike and extend through the holes in the guides to rest upon the floor of the housing 10. Within each tube there is a small weight 22 to which a string 14 is attached and the string is led upwardly from the tube through the corresponding opening 13 and the top 11 where it is knotted or headed so as to prevent its passing down through the opening 13 all of the way. The table top section 11 or 12 can be lifted with a set of strings and removed in its entirety, leaving the tubes 21 in the guides. The three panels 16, 17 and 18 are fastened together by suitable bolts 24 and spacers 25.

In order to mount strings above the table tops, a supporting frame 11a is provided for the removable table tops 11 and 12. The frame is removably mounted on the housing 10 by a peripheral rib 10a on the top of the housing 10 and a corresponding groove in the frame 11a. At each end of the housing 10 mounting blocks 26 and 27 are provided. These blocks are provided with sockets 28 and 29 adapted to receive upright posts 30 and 31, the lower ends of which are reduced in diameter so as to engage in the sockets. The posts 30 and 31 receive "Starrett sleeve" clamps 32 and 33 which in turn are adapted to clamp supporting bars such as the main cross bar 34 or a hook bar 35 at the desired position on the posts. The suspension bars 36 and 37 are provided with suitable clamps 38 and 39 for clamping on the horizontal bar 34. The suspension bars 36 and 37 may take any suitable shape or design. For example, in Figure 6 I have shown the suspension bar as straight with a fixed collar 40 thereon, a threaded portion 41 and a hook 42. The threaded portion is adapted to receive a wing nut 43, similar to the nut shown in Figure 7. The hook bar 35, likewise, is provided with a fixed collar 44, a threaded portion 45 and a hook 46 to engage the strings. The hooks preferably are made as shown in Figure 7 so that a number of strings can be engaged with the knots holding the strings against removal.

In order to set up a figure, for example, a pyramid as shown in Figure 6, four strings are drawn upwardly from certain of the apertures 13 and hooked into the hook 42 which is suspended by the bar 36. In the illustration of Figure 6, a central string is also brought up to the hook 42 and secured in place. In Figure 6 the demonstration is of a plane intersecting a pyramid parallel to the base. The plane may be any suitable sheet of material 47 with slots in the edges and corners thereof as indicated at 48 (see Figure 8). The sheet 47 is also apertured at various places to permit mounting it on one of the bars 35 by passing the threaded portion of the bar through an opening in the sheet and clamping the sheet against the collar 44 by means of the wing nut 43. It will be understood, of course, that various shapes of the sheets are provided, such for example, as squares, rectangles, ellipses and the like for demonstrating the intersection of various solid figures by a plane. The sheets 47, like the table tops 11 and 12, are preferably coated suitably so that they may be used to mark lines with chalk thereon like the usual blackboard. It is believed to be evident that various relationships of the parts of the quadrangular right pyramid shown in Figure 6 can be demonstrated very effectively with the device. It is easy to show the relation of a line A—O to another line A'—O'.

In Figure 9 I have shown another demonstration in which the figure is an oblique prism. The sheet 47 in this instance is used for the top of the figure. The lower end of the prism is outlined in chalk on the table top 11. The strings 14 for the four longitudinal edges of the prism are drawn up to and secured on the sheet 47. Also the four diagonals of the prism are formed by using the other strings at each of the points A, B, C, D. By this demonstration the student can easily see that the diagonals intersect at a point which is the center of the prism. The diagonal strings 14 form two like oblique pyramids within the prism. It is easy, with this device, to demonstrate the various propositions relating to the prism shown.

In Figure 10 of the drawings the top of a tube rack 15' with a modified pattern is shown. In this rack the tubes 21' are arranged for the demonstration of elliptical bodies. The rack is cut out on one side at 50 so it may be mounted on either side of the housing. A suitable top section having corresponding string openings is of course provided for cooperation with the rack 15'.

Figures 11 and 12 illustrate a modification which is particularly adapted for use on a table. In this form of the invention a shallow housing 51 is provided with a top plate 52 which has string apertures 53 therein for strings 54. In this form of the invention the strings are wound on small spools 55 which are mounted on the bottom wall 56 of the housing 51. The spool (see Figure 12) is journalled on a shaft 57 which is fastened in standards 58 and 59. A coiled spring 60 is mounted inside the spool with one end 61 fastened to the shaft 57 and the other end 62 fastened to the spool. The spring serves to keep the strings drawn down into the housing but permits them to be pulled out for making the figures for demonstration. The use of the table model is the same as the main form of the invention.

The holes 13 provided in the table tops 11 and 12 are arranged in the proper geometric patterns to permit a demonstration of a great variety of non-spherical solid figures such as are conventionally required by solid geometry text books. As an example of the general utility of the device, the following list of various constructions of pyramids, cylinders and cones is given as a partial group of the figures that may be demonstrated.

1. Prisms
   A. Right prisms such as triangular, quadrangular, hexagonal and octagonal right prisms
   B. Oblique prisms such as triangular, quadrangular (parallelopiped) hexagonal and octagonal, oblique prisms
   C. Truncated prisms, either right or oblique
2. Pyramids; triangular, quadrangular, hexagonal and octagonal
   A. Right pyramids
   B. Oblique pyramids
   C. Frustums of right pyramids
   D. Frustums of oblique pyramids
3. Cylinders; right and oblique
   A. Circular cylinders
   B. Elliptical cylinders
4. Cones; right and oblique, (circular and elliptical)
5. Conic sections, parabolas, hyperbolas, ellipses, and circles
6. Inscribed polyhedra such as:
   A. Prisms inscribed in cylinders
   B. Pyramids inscribed in cylinders
   C. Pyramids inscribed in cones
   D. Frustums of pyramids inscribed in frustums of cones.
7. Circumscribed polyhedra such as:
   A. Prisms circumscribed about cylinders
   B. Prisms circumscribed about cones
   C. Pyramids circumscribed about cones
   D. Frustums of pyramids circumscribed about frustums of cones.
8. Pyramids inscribed in prisms
9. Cones inscribed in cylinders.

The above list is, of course, only partial. More specific forms of the above general classes of figures with variations in angles and dimensions may be demonstrated easily. Many theorems and corollaries may be shown with the demonstrator. Those theorems and corollaries concerning lines and planes and the various solids hereinbefore mentioned may be shown.

Experience has shown that the three-dimensional mathatical demonstrator can be used in the classroom to make more meaningful the basic concepts employed in solid geometry. Either student or teacher can construct the desired figures or demonstrate relationships. Students appear gradually to overcome their inability to visualize and represent the relative positions on the demonstrator of objects in space. As a result, they develop a knowledge of familiar spatial relationships. Once the student has this knowledge, or if the teacher wants to test for understanding, the student can "build" the figures himself.

The optical illustion experienced when viewing single plane representations of solids disappears almost completely when each figure is set up and portrayed in its true shape. By the use of the demonstrator, it is possible to construct or to have constructed the figures as they naturally appear; and it does not require the utilization of the somewhat questionable skill of an average instructor to portray the figures on the blackboard. As pointed out earlier, blackboard drawings are flat, therefore, it naturally follows that projections are necessary in order to show all the sides of the figures. On the other hand, in drawing projections on the blackboard it is difficult for the student to realize exactly the true shape of the figures unless the instructor is particularly skilled in both (a) drawing and (b) explanations. In the usual course of events, the drawings must be put on hurriedly to conserve time, and may be inaccurate, with the result that the drawings may confuse rather than clarify. The economy of time spent in construction, and the effective accuracy of the demonstrator overcomes these difficulties.

The outstanding advantages of the demonstrator are its flexibility, wide variety of figures and relationships, its transparency, simplicity, and suitability to student use.

By the use of the demonstrator it is made possible to see all sides of the figure without distortion, and in addition thereto, it is made possible to show imaginary lines and planes as represented by the various strings and flat inserts which may be set up as necessary. In short, solids are solid. They appear in but one shape, the shape in which they are made. But in geometry there is need for cross-sections, the superimposition of figures, the inscribing and circumscribing of figures, the gradual change from one type or shape of figure to another. These are limitations for the solid models and advantages for the demonstrator. Blackboard drawings and conventional textbook drawings can illustrate the various cross-sections, lines and relationships, with the use of many foreshortened and dotted lines. For some students these drawings may heighten the confusion of concepts in the early stages of learning. Such misconceptions may result in faulty learning or in poor attitudes. Although three-dimensional pictures as represented by the stereograph do not rely upon the devices of foreshortened lines, etc., to show three dimensions, they have in common with other drawings and illustrations the limitation of inflexibility. The demonstrator is versatile enough not only to allow the showing of guide and imaginary lines as mentioned, but also to show cross-sections of figures in almost unlimited numbers. The type of cross-section used is entirely within the control of the instructor operating the demonstrator. Since cross-sections are imperative to proper understanding of solid geometry, it follows that the demonstrator becomes a valuable teaching aid in arriving at that objective.

One of the strongest appeals of the demonstrator is its use by students to construct and clarify their concepts. Not infrequently, a student will challenge the accuracy of a statement of a theorem or figure, which question can usually be answered by means of measurement or construction. It is desirable to establish a certain amount of confidence in a student in any subject, and particularly in a subject such as solid geometry, which is well known to be somewhat difficult, "abstract," and complex. If the student is able to dispel his doubts by accurate measurements, then he is able to proceed confidently ahead, whereas, if doubt prevails, he may become emotionally upset. As mentioned above, blackboard drawings do not lend themselves to measurement, since as we have seen, solids can only be drawn thereon by projection methods. On the other hand, if solids are used, measurements are limited to outside surfaces, and certain internal measurements which can be calculated only by the use of certain formulas. But with the demonstrator it is possible to make internal measurements of lines, cross-sections, guide lines, superimposed, circumscribed and inscribed figures. The advantage should be easily recognized.

The wide range of figures and spatial relationships that can be handled by the demonstrator makes it possible to present practically any type of problem met in the study of lines, planes, polyhedra, inscribed and circumscribed polyhedra, circular cylinders and cones, and elliptical cylinders and cones.

The demonstrator is designed to illustrate two separate figures at the same time. The arrangement of the strings on both units are such that two figures that are congruent or similar to each other can be set up. For example, it would be possible to set up two hexagonal pyramids that are congruent or similar to one another, or it would be possible to illustrate a right hexagonal prism on one unit and an oblique circular cylinder on the other.

A unique feature of the flexibility of the demonstrator is the speed and ease of transition from one figure to another. For example, a right quadrangular prism can be transformed into an oblique quadrangular prism by loosening the "Starrett" sleeve and sliding it along the horizontal bar. The student can watch the figure change shape in much the same manner as he sees movement in a motion picture. It can be illustrated that the angle made by the lateral edges (strings) with the lower base is determined by the distance the sleeve is moved along the horizontal rod. If the upper base (disc) is held at the same distance and parallel from the lower base, the volume of the figure does not change even though the figure has been changed from a right to an oblique prism. This is true, for the volume of a prism is determined by the area of the base times the altitude, and these two factors can be held constant. If the rod supporting the disc is moved in a vertical direction, either up or down, the volume of the figure can be increased or decreased as the altitude is changed. It is possible to move in both a horizontal and a vertical direction or at an angle to either of them. For example, by tilting the upper base of a right prism in such a way that it is not parallel to the lower base, one will have a truncated prism.

To create new figures, the discs can be rotated in a clockwise or counter-clockwise direction. These figures can be changed as to volume and configuration by lowering or raising the disc or increasing the turning of the disc.

Having thus described my invention, I claim:

1. A device for demonstrating geometric figures comprising in combination, a housing, a frame work therein comprising a plurality of horizontally extending vertically spaced panels and means to support them in the housing in spaced relation said panels each having a multiplicity of apertures therein arranged in the same predetermined geometric patterns so that the corresponding apertures in the different panels are aligned, a multiplicity of tubes in the housing each tube extending through the corresponding apertures of the panels, weights slidable in said tubes, flexible members secured to said weights, and projecting from the upper ends of said tubes, a table section over said housing having apertures therein over said tubes, the apertures being arranged in the same predetermined geometric patterns as the apertures in said panels, said members extending through the apertures in said table section and having heads above the table section too large to pass through the apertures in said table section, and a support on said housing above the table top having means on which the heads of said members may be releasably mounted.

2. A device for demonstrating geometric figures comprising in combination, a housing, a framework therein comprising a plurality of horizontally extending vertically spaced panels and means to support them in the housing in spaced relation said panels each having a multiplicity of apertures therein arranged in the same predetermined geometric patterns so that the corresponding apertures in the different panels are aligned, a multiplicity of tubes in the housing each tube extending through the corresponding apertures of the panels, weights slidable in said tubes, flexible members secured to said weights, and projecting from the upper ends of said tubes, a table section over said housing having apertures therein over said tubes, the apertures being arranged in the same predetermined geometric patterns as the apertures in said panels, said members extending through the apertures in said table section and having heads above the table section too large to pass through the apertures in said table section, each of the tubes being located under an aperture, certain apertures in the table section having more than one tube under them with flexible members from all such tubes extending through the same aperture, and a support on said housing above the table top having means on which the heads of said members may be releasably mounted.

3. A device for demonstrating geometric figures comprising in combination, a housing, upright means thereon for supporting rods, and the like, above the housing, a removable table top on the housing, said top having a multiplicity of apertures therein arranged in a predetermined geometric pattern radially and circumferentially about a central point on said table, tubular string guides under the apertures, means supporting said tubular guides in upright position in the housing, strings extending through said apertures and having heads thereon over the table, and means in said tubular guides pulling the strings downward, the means supporting said guides comprising vertically spaced horizontal panels in said housing, said panels having aligned apertures therein through which the tubular guides are vertically movable, certain aligned apertures in said panels having more than one tubular guide therein.

FLOYD P. ARMSTEAD.

REFERENCES CITED

The following references are of record in the file of this patent:

UNITED STATES PATENTS

| Number | Name | Date |
|---|---|---|
| 630,217 | Hanstein | Aug. 1, 1899 |
| 2,168,634 | Spencer | Aug. 8, 1939 |
| 2,312,175 | Korotzer | Feb. 23, 1943 |
| 2,459,749 | Bosomworth | Jan. 18, 1949 |